July 7, 1931. W. WUERFEL 1,813,791

PISTON RING

Filed May 28, 1930

INVENTOR
William Wuerfel
BY
Leonard L. Kalish
ATTORNEY

Patented July 7, 1931

1,813,791

UNITED STATES PATENT OFFICE

WILLIAM WUERFEL, OF PHILADELPHIA, PENNSYLVANIA, ASSIGNOR TO WILKENING MANUFACTURING COMPANY, OF PHILADELPHIA, PENNSYLVANIA, A CORPORATION OF DELAWARE

PISTON RING

Application filed May 28, 1930. Serial No. 456,350.

My invention relates to piston rings adapted to control the oil in internal combustion engines and the like, generally known as "oil control" rings.

The object of my invention is to utilize the surface tension of the oil in sealing piston rings against the sides of the ring-receiving grooves of the piston, sufficiently to maintain the desired seal against the passage of oil or gas, behind the ring, from the combustion or compression chamber (in engines or pumps, or the like) into the crank case, or vice versa, without unduly increasing friction or diminishing the lubrication between the cylinder wall, and the piston ring. By this construction too, the efficacy of the ring is maintained at all speeds.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in which like reference characters indicate like parts, Figure 1 is a section of a ring in a ring groove of a piston, on line 1—1 of Figure 2; the piston and cylinder being broken away.

Figure 1:
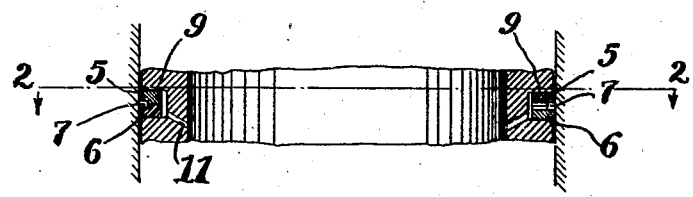
Figure 2:
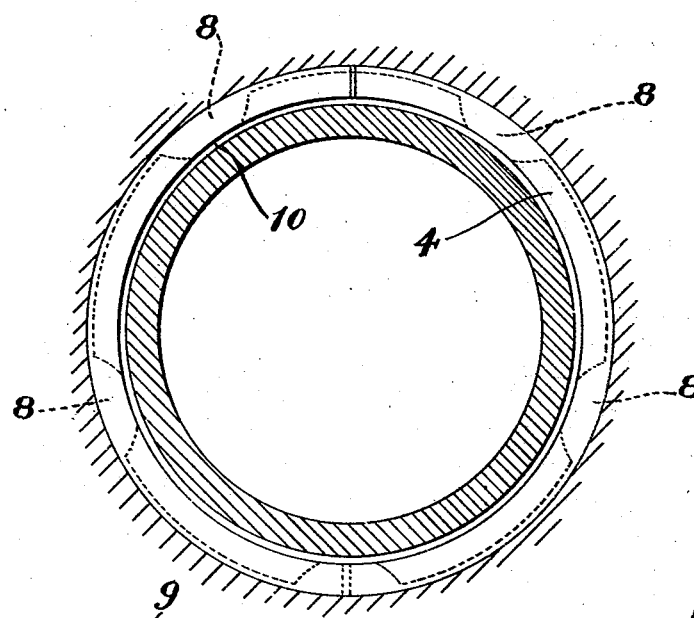
Figure 2 is a plan view of the ring with the piston and cylinder shown in section on line 2—2 of Figure 1.

The ring 4 is a two-piece ring, composed of two similar and opposed split, annular cast iron members 5 and 6, which preferably have the same width, radial depth, and other dimensions, and preferably have plane, flat, contiguous and opposed contacting surfaces.

The ring 4 is formed with an outer annular oil-collector groove 7 in the outer peripheral cylindrical surface thereof. The annular oil-collector groove 7 is preferably formed one half in each of the two opposed annular ring members 5 and 6. A series of radial oil channels 8 are formed through the ring 4, and these oil channels are also preferably formed one half in each of the two ring members 5 and 6.

The width of the ring 4, that is its axial width, or the aggregate width of its two constitutent ring members 5 and 6, is made sufficiently less than the width of the ring-receiving groove 9 (beyond the conventional diminution of such width required for the normal "fit"), to provide a lateral or axial clearance between the ring 4 and the ring-receiving groove 9, which will become a part of an oil circuit with the outer annular groove 7 in the ring 4, the oil channels 8, and the inner radial clearance space or oil-chamber 10.

Figure 3:
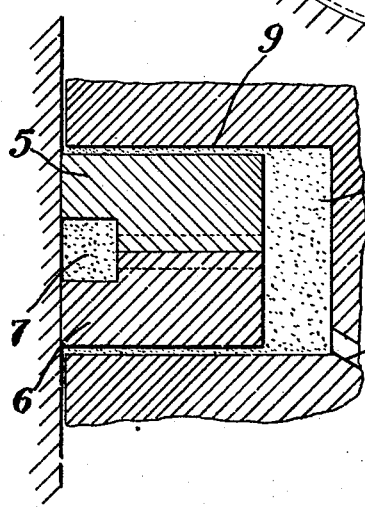
Figure 3 is a section like that shown in Figure 1, much enlarged however, (and with the central piston portion broken away) so as to permit of a clearer illustration of the relation of the ring to the groove.

In Figure 3 an illustration of this has been attempted on a much enlarged scale, because the clearances, while comparatively large, are actually small, and difficult of illustration in a drawing approximately full size, as in Figure 1.

Thus, whereas the conventional clearance required merely for the normal "fit" is approximately one or one and a half thousandths of an inch difference between ring width and groove width, the difference in this construction between the aggregate ring width and the groove width is made about five thousandths of an inch, more or less.

Merely for purposes of illustration, this clearance, forming part of this construction, is shown divided between the two outer side walls of the ring 4 and the side walls of the ring groove 9.

In the operation of this ring, some of the oil which is applied to the cylinder walls, by "splash" from the crank case or otherwise, is gathered into the oil-collector groove 7, by a scooping action of the outer edges of said groove 7, as the ring rides over the oil film on the cylinder wall. This constant scooping action collects oil in the groove 7 and tends to fill the groove 7, the radial oil channels 8 and the inner radial clearance space 10, and supplies oil to the lateral clearance between the aggregate ring width and groove width. The oil supply thus maintained, is drawn into the lateral or axial clearance spaces, by capillary action, or surface tension and is retained in the clearance spaces by the surface tension or viscosity and adhesion of the oil.

The action of the oil layer, in the axial clearance space, is that of a cushion and seal between the sides of the ring and the sides of the groove. While it has not as yet been determined definitely, it seems that the aggregate clearance space is divided substantially equally between the top and bottom and center of the ring and possibly shifts somewhat on the two opposed strokes. The result however, is the formation of a capillary oil layer, in the lateral clearance between ring and groove, whether such clearance is entirely on one side of the ring or on the other side of the ring, or divided between the two sides, and possibly the center, so that not only will the normally-expected lateral ring-slap be entirely absent, but the ring will be sealed laterally under oil pressure by oil layers which cushion the ring laterally.

The excess oil taken into the annular radial clearance space or oil chamber 10 behind the ring, is drained back into the crank case through the piston wall by the oil passageways or drain holes 11 which extend through the piston wall, as particularly indicated in Figures 1 and 3. This drains off all the excess oil and leaves only the cushioning layers of oil which take up the excess axial clearance.

The outward radial expansion of the ring may be effected by any of the conventional means now known. Thus, an outward radial tension may be set into the body of the ring by peening, heating, or otherwise fatiguing the ring to a suitably expanded condition, or, by forming the ring oversize in diameter, and removing sufficient from its circumference to permit collapsing to the cylinder diameter against the normal tension of the metal. So too, radial spring expanders may be placed between the inner surface of the ring and the bottom of the ring groove.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I hereby claim as new and desire to secure by Letters Patent, is:—

1. The combination with a cylinder and a piston adapted to travel therein, the latter having an annular ring-receiving groove therein, the defining walls of which are integral with each other, of an axially divided multi-piece, split, annular cast iron piston-ring having an outer annular oil-collector groove in the outer cylindrical surface thereof, divided between the several annular ring members comprising said piston-ring, a plurality of generally radial oil passageways, distributed over the periphery of the ring, extending from said outer annular oil-collector groove through the piston-ring, into an oil chamber formed between the inner peripheral surface of the piston-ring and the inner wall of the ring-receiving groove; the dimensions of said radial passageways in a direction parallel to the periphery of the ring being greater than their dimensions in a direction parallel to the axis of the ring, and lateral or axial clearance between piston ring and ring-receiving groove in excess of the normal clearance required to fit the piston-ring into said groove, sufficient to permit the formation and maintenance of a layer of oil in said lateral clearance between piston-ring and ring-receiving groove.

2. The combination with a cylinder and a piston adapted to travel therein, the latter having an annular ring-receiving groove therein, the defining walls of which are integral with each other, of an axially divided two-piece, split, annular cast-iron piston-ring having an outer annular oil-collector groove in the outer cylindrical surface thereof, divided between the two annular ring members comprising said piston-ring, a series of peripherally spaced and generally radial oil passageways extending from said outer annular oil-collector groove through the piston-ring, into an oil chamber formed between the inner peripheral surface of the piston-ring and the bottom of the ring-receiving groove, the dimensions of said radial passageways in a direction parallel to the periphery of the ring being greater than their dimensions in a direction parallel to the axis of the ring, and lateral or axial clearance between piston-ring and ring-receiving groove in excess of the normal clearance required to fit the piston-ring into the groove, sufficient to permit the formation and maintenance of a layer of oil, in said lateral clearance between piston-ring and ring-receiving groove.

3. The combination with a cylinder, of a piston adapted to travel therein, the latter having an annular ring-receiving groove therein, the defining walls of which are integral with each other, and of an axially divided multi-piece, split annular piston ring, having a plurality of generally radial oil passageways peripherally distributed and extending from the outer periphery of said piston ring to the inner periphery thereof to an oil chamber formed between the inner peripheral surface of the piston ring and the inner wall of the ring-receiving groove, the outer ends of said generally radial oil passageways forming oil collector chambers to gather oil from the surface of the cylinder, and the dimensions of said radial passageways in a direction generally parallel to the periphery of the ring being greater than their dimensions in a direction generally parallel to the axis of the ring, means extending through the piston wall for draining the excess oil gathered from the cylinder wall by said ring, and lateral or axial clearance between piston ring and ring-receiving groove, sufficiently in excess of the normal clearance required to fit the piston ring said ring-receiving groove, to permit the formation and maintenance of a layer of oil in said lateral clearance between piston-ring and ring-receiving groove.

4. The combination with a cylinder, of a piston adapted to travel therein, the latter having an annular ring-receiving groove therein, the defining walls of which are integral with each other, and of an axially divided two-piece, split annular metallic piston ring, having a series of peripherally spaced and generally radial oil passageways extending through the ring with their outer ends opening in the outer peripheral cylinder-contact surface of the piston ring and serving to scrape oil from the cylinder wall and to gather the said oil and to pass the same through the ring into an oil chamber formed between the inner peripheral surface of the piston-ring and the bottom of the ring-receiving groove, the dimensions of said radial passageways in a direction parallel to the periphery of the ring being greater than their dimensions in a direction parallel to the axis of the ring, and lateral or axial clearance between piston ring and ring-receiving groove, sufficiently in excess of the normal clearance required to fit the piston ring into the groove, to permit the formation and maintenance of a layer of oil in said lateral clearance between piston-ring and ring-receiving groove, and oil drainage means extending through the piston wall to drain the excess oil gathered by the piston ring.

5. The combination with a cylinder, of a piston adapted to travel therein, having an annular ring-receiving groove, the defining walls of which are integral with each other, and of an axially divided multi-piece, split, annular metallic piston-ring, each ring member comprising said multi-piece piston-ring having an annular cylindrical cylinder-contact surface portion, continuous and uninterrupted annularly, except for the very slight interruption at the split, the axial width of said continuous and annularly uninterrupted cylinder-contact surface portions being less than the over-all axial widths of said ring members, respectively, a series of peripherally spaced and generally radial oil passageways extending through the piston-ring, having their outer ends intermediate said continuous and annularly uninterrupted cylinder-contact surface portions of the several ring members, and having their inner ends extending to an oil chamber formed between the inner peripheral surface of the piston ring and the bottom of the ring-receiving groove, the dimensions of said radial oil passageways in a direction generally parallel to the periphery of the ring being greater than their dimensions in a direction generally parallel to the axis of the ring, lateral or axial clearance between piston-ring and ring-receiving groove sufficiently in excess of the normal clearance required to fit the piston-ring into the ring-receiving groove, to permit the formation and maintenance of a layer of oil in said lateral clearance between piston-ring and ring-receiving groove, and means extending through the piston wall for draining the excess oil gathered by said piston-ring, from the surface of the cylinder.

6. The combination with a cylinder, of a piston adapted to travel therein, having an annular ring-receiving groove, the defining walls of which are integral with each other, and of an axially divided two-piece, split, annular metallic piston-ring, having an outer annular oil-collector groove in the outer cylindrical cylinder-contact surface thereof, divided between the two annular ring members comprising said piston-ring, a series of peripherally spaced and generally radial oil passage recesses extending across the juxtaposed, abutting and contiguous faces of each of the two ring members, from said outer annular oil-collector groove, to an oil chamber formed between the inner peripheral surface of the piston-ring and the bottom of the ring-receiving groove, the dimensions of said generally radial recesses in a direction generally parallel to the periphery of the ring being greater than their dimensions in a direction generally parallel to the axis of the ring, and lateral or axial clearance between the piston-ring and ring-receiving groove, sufficiently in excess of the normal clearance required to fit the piston-ring into the ring-receiving groove, to permit the formation and maintenance of a layer of oil in said lateral clearance between piston-ring and ring-receiving groove, and means extending through the piston wall, for draining the excess oil gathered by said piston-ring from the cylinder wall.

In testimony whereof I have hereunto set my hand this 22nd day of April, 1930.

WILLIAM WUERFEL.